…

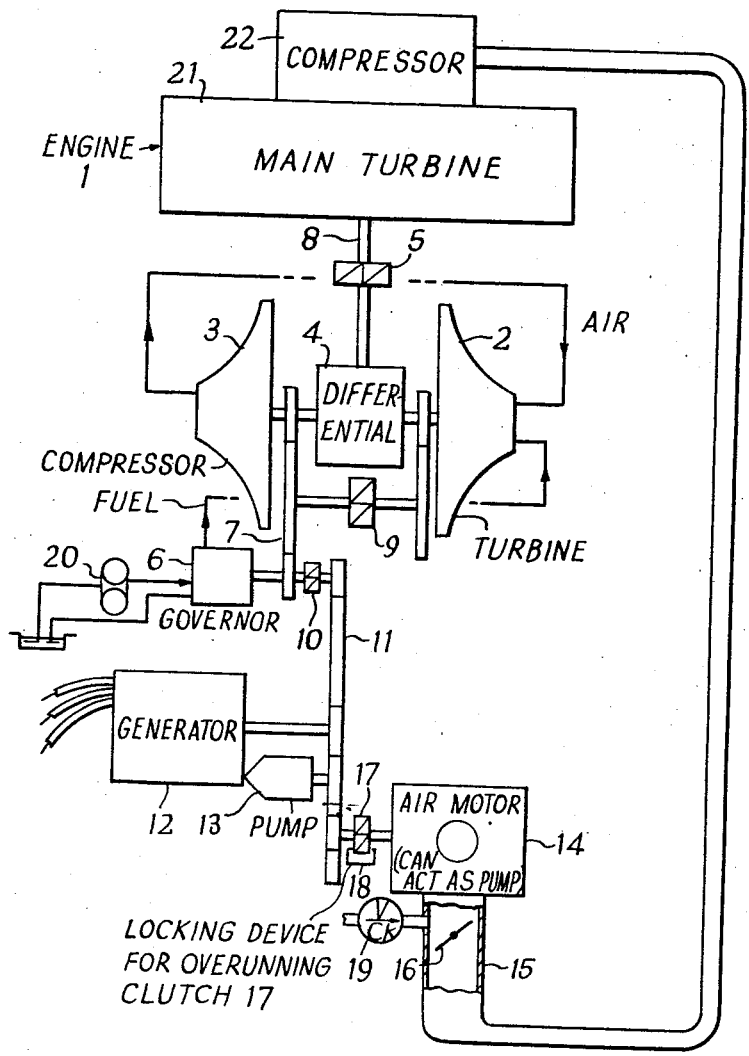

United States Patent Office 3,145,532
Patented Aug. 25, 1964

3,145,532
GAS-TURBINE OPERATED ENGINE STARTERS
Norman Moss, Ilford, England, assignor to The Plessey Company Limited, Ilford, England, a British company
Filed July 24, 1962, Ser. No. 215,476
Claims priority, application Great Britain July 27, 1961
6 Claims. (Cl. 60—39.14)

This invention relates to engine starters of the kind in which a gas turbine is utilised as the starter motor. In order to make it possible for a turbo-compressor driven by the starter turbine to be utilised for the supply of combustion air to the said turbine during the starting operation, it has been proposed in co-pending U.S.A. application Serial No. 210,878 to couple the starter turbine by differential gearing both to its compressor and to the engine to be started in such a manner that the engine speed is differentially proportional to the respective speeds of the starter turbine and the starter compressor, and to provide either one or the other of the starter turbine and its compressor, preferably the compressor, with a governor which so regulates the fuel supply to the starter turbine as to maintain the governor speed, and thus preferably the compressor speed, constant throughout the operation of the unit. An engine starter incorporating these features of the said co-pending application will hereinafter be called "of the kind specified."

The present invention has for an object to provide an improved starter unit of the kind specified which is adapted to be also used, in addition to its operation as a starter, as a constant-speed drive, for example for driving an alternator for the supply of electric power in an aircraft. For this purpose, according to the present invention, a one-direction clutch (also called over-running clutch) is interposed between the starter turbine and its compressor and parallel to the differential gear, in such a manner as to establish direct driving connection between the turbine and its compressor, by-passing the differential gear, when the starter output shaft reaches engine decoupling speed or a speed slightly above engine decoupling speed, the constant-speed output being derived from the compressor if the governor drive is driven by the compressor, or from the turbine in the case of a turbine-driven governor. One embodiment of the invention is diagrammatically illustrated in the accompanying drawing.

Referring now to the drawing, an engine 1 is disclosed. This engine is represented as a gas turbine 21 hereinafter called main turbine, which is equipped with a compressor 22 for its combustion air. The starter unit for the engine 1 comprises a starter motor in the form of a gas turbine 2 which is supplied with combustion air by a turbo-compressor 3, with which it is coupled through a differential gear drive 4, the third outlet of which is connected to the starter-output shaft 8 and the engine via an over-running clutch 5. The fuel supply to the starter turbine 2 is governed by a governor 6 which is driven by gearing 7 at a speed proportional to that of the compressor 3. The equipment as so far described works during starting of the engine in the manner described in the said co-pending application: First the gas turbine 2 is started by any conventional means, and its output power is at first substantially wholly transmitted to the compressor 3, which thus soon reaches its design speed at which its delivery pressure is sufficient for the supply of combustion air to the turbine; then, as the engine is gradually accelerated via the over-running clutch 5, the governor 6 so controls the fuel supply from a fuel pump 20 to the turbine 2 and thus the speed of that turbine that the speed of the compressor 3 remains approximately constant notwithstanding the increase in the speed of the engine 1. When the starter output shaft 8 reaches engine-decoupling speed, a further over-running clutch 9 becomes engaged and thus bypasses the differential gear drive by locking the turbine 2 to the compressor 3 so that they thereafter run at a fixed speed ratio. When the engine 1 is further accelerated by its own power, the over-running clutch 5 becomes dis-engaged, the power developed by the turbine 2 being no longer required for accelerating the engine 1. To permit utilisation of this power, the gear drive 7 is coupled, via a further over-running clutch 10, with additional gearing 11 connected to an A.C. generator 12 which, due to the action of the governor 6, is thus driven at a constant speed as soon as the compressor has reached its design speed at the beginning of the starting operation, and this constant-speed drive of the compressor 12 remains operative when, upon engagement of the over-running clutch 9, the turbine 2 becomes disengaged by the clutch 5 from the engine 1. The gearing 11, which is driven by the compressor 3 through gearing 7 and therefore is driven at a constant speed, may be additionally or alternatively used for driving a hydraulic pump 13.

When the apparatus is installed in an aircraft, the output of the turbine 2 will decrease with increasing height of the aircraft, and as a result the power available for driving the generator 12 and pump 13 tends to decrease as the aircraft gains height. According to a further feature of the invention this tendency may be compensated for by a motor 14, which may be an air motor of the turbine type or the displacement type, and which can be fed, via a duct 15 containing a control valve 16, with bleed air from the compressor of the main engine 1 if the latter is a turbo-engine. In order to avoid the use of power from the turbine 2 for driving the air motor 14 when no air is available in duct 15, an over-running clutch 17 is interposed between the gearing 11 and the air motor 14, allowing the air motor to remain stationary when the gearing 11 is driven by the turbine 2. The air motor 14 can also be utilised to drive the gearing 11 and generator 12 without assistance from the turbine 2, more particularly in the case of a breakdown of the latter, in which case the over-running clutch 10 isolates the compressor and its gearing 7 from the generator-drive gearing 11, thus avoiding transmission of power from the air motor 14 to the compressor 3. On the other hand the over-running clutch 17 may be equipped with a device 18 by which it can be locked to drive the air motor 14, which in this case operates as a pump that may be used, for example, for supplying pressurisation air to an aircraft cabin under ground-running conditions or in the case of a failure of the main engine and of consequent non-availability of main-turbine compressor-bleed air for this purpose. This possibility is indicated in the drawing by an auxiliary inlet controlled by a check valve 19.

What I claim is:

1. A combined engine-starter and constant-speed drive unit which comprises a gas-turbine, a turbo-compressor supplying the gas turbine with combustion air, a starter output shaft for connection to a combustion engine, a three-leg differential gear drive the legs of which are respectively operatively connected to the turbine, the output shaft, and the compressor, a fuel governor controlling the fuel supply to the gas turbine to maintain its speed constant driven by one of those legs of the differential gear drive which are respectively connected to the gas turbine and the compressor, means operable to disconnect the starter output shaft from the differential gear drive, and a one-way clutch in a gear drive which, in parallel with those legs of the differential that are connected to the turbine and compressor, connects the turbine to the compressor to bypass the differential gear drive and couple the turbine to the compressor when the turbine speed exceeds a pre-determined ratio to the compressor speed, and a constant-speed output shaft drivingly connected to that leg of the differential gear drive by which the governor is driven.

2. An engine starter as claimed in claim 1, wherein said means operable to disconnect the starter output shaft from the differential gear drive include an over-running clutch interposed between the differential gear drive and the starter output shaft.

3. An engine starter as claimed in claim 1, further comprising an auxiliary motor and means including an over-running clutch coupling said motor to the constant-speed output shaft.

4. In a combustion power plant including a gas-turbine engine equipped with an engine-driven turbo-compressor, the combination comprising an engine starter as claimed in claim 3, connected to the said engine, and means for feeding the auxiliary motor with bleed air from the said turbo-compressor.

5. A combined engine-starter and constant-speed-drive unit which comprises a gas turbine, a turbo-compressor supplying the gas turbine with combustion air, a starter output shaft for connection to a combustion engine, a three-leg differential gear drive the legs of which are operatively connected respectively to the turbine, the output shaft and the compressor, a fuel governor controlling the supply of fuel to the gas turbine to maintain its speed constant, said governor being drivingly connected to the compressor, means operable to disconnect the starter output shaft from the differential gear drive, and a one-way clutch in a gear drive which, in parallel with those legs of the differential that are connected to the turbine and compressor, connects the turbine to the compressor to by-pass the differential gear drive and couple the turbine to the compressor when the turbine speed exceeds the predetermined ratio to the compressor speed, and a constant-speed output shaft drivingly connected to the compressor.

6. In a combustion power plant including a gas turbine engine equipped with an aerodynamic compressor driven by said engine, the combination including a unit as claimed in claim 5 connected to said engine, an air motor, means for feeding the air motor with bleed air from the said aerodynamic compressor, the means operable to disconnect the starter output shaft from the differential gear drive including a first over-running clutch interposed between the differential gear drive and the starter output shaft, and means including a second over-running clutch coupling said air motor to the constant-speed output shaft.

References Cited in the file of this patent
UNITED STATES PATENTS

| | | |
|---|---|---|
| 2,402,547 | Gilfillan | June 25, 1946 |
| 2,959,918 | West | Nov. 15, 1960 |

FOREIGN PATENTS

| | | |
|---|---|---|
| 1,205,114 | France | Aug. 17, 1959 |